June 2, 1964

M. FIEDLER 3,135,011

HINGE

Filed Feb. 28, 1961

2 Sheets-Sheet 1

INVENTOR.
Martin Fiedler,
BY Parker & Carter
Attorneys.

INVENTOR.
Martin Fiedler,
BY Parker & Carter
Attorneys.

United States Patent Office 3,135,011
Patented June 2, 1964

3,135,011
HINGE
Martin Fiedler, Chicago, Ill., assignor to Chicago Forging & Manufacturing Co., Chicago, Ill., a corporation of Illinois
Filed Feb. 28, 1961, Ser. No. 92,201
2 Claims. (Cl. 16—128.1)

This invention relates to an articulated hinge or the like suitable for use with an automobile hood.

One purpose of the present invention is to provide a hinge of the type described having a plurality of movable members and effective to cause simultaneous forward and upward movement of the hood cover.

Another purpose is an articulated hinge assembly which is suitable for use with automobile hoods or the like and is effective to hold the hood cover in an open position without the use of a conventional spring.

Another purpose is to provide an articulated hinge of the type described which is balanced in that the hinge members are positioned on opposite sides of the mounting plate.

Another purpose is a hinge assembly for use on automobile hoods and which has parts thereof suitable for use in either a right-hand or left-hand hinge assembly.

Other purposes will appear in the ensuing specification, drawings and claims.

Figure 1:
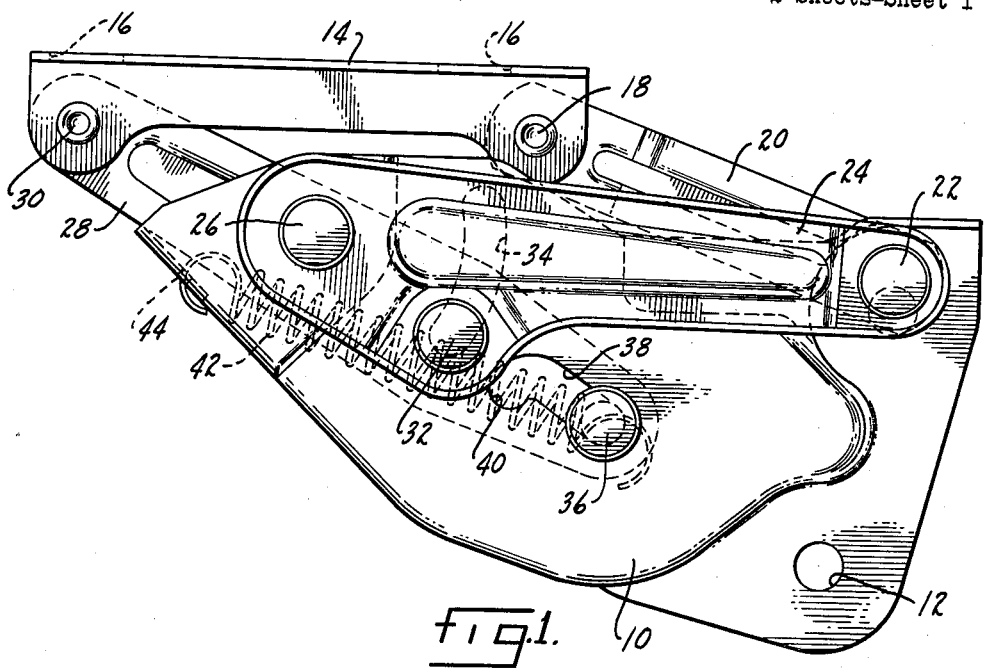
Figure 3:
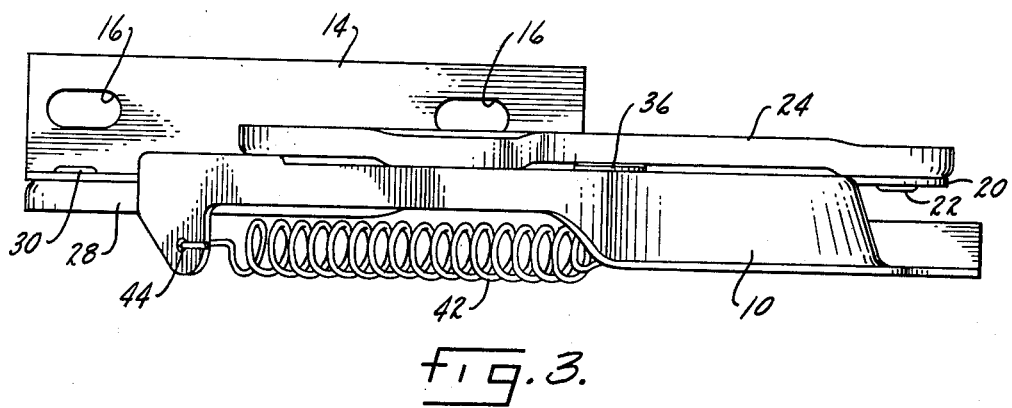
Figure 2:
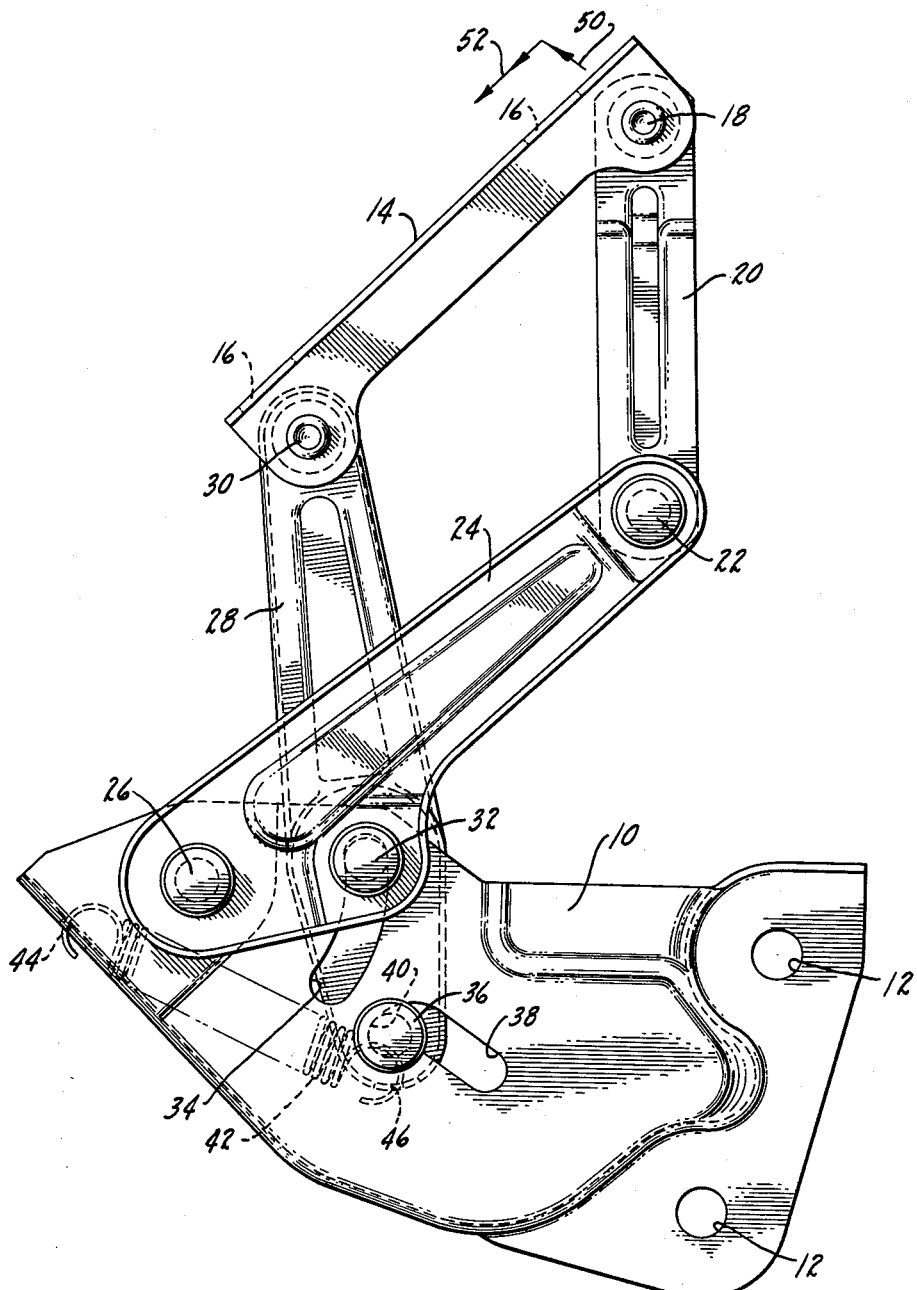

The invention is illustrated diagrammatically in the following drawings wherein:

FIGURE 1 is a side view of the hinge of the present invention in the lowered or closed position, FIGURE 2 is a side view of the hinge of FIGURE 1 in the open or upper position, and FIGURE 3 is a bottom view of the hinge of FIGURE 1.

A mounting plate 10 has apertures or holes 12 for use in mounting the hinge assembly to the body of an automobile or other vehicle. A bracket 14 has mounting apertures 16 for use in mounting the bracket to the hood cover of an automobile or the like. The upper end of the bracket, when in the extended or open position of FIGURE 2, is pivotally connected, as at 18, to a link arm 20. The link arm 20 is, in turn, pivotally connected adjacent its opposite end, as at 22, to a first hinge lever 24. The hinge lever 24 is pivotally mounted adjacent its opposite end, as at 26, to the mounting plate 10.

Pivotally connected to the opposite end or the lower end of the bracket 14, as shown in its open position, is a second hinge lever 28. The pivotal connection between the second hinge lever and the bracket 14 is illustrated at 30. The second hinge lever 28 is pivotally connected to the first hinge lever 24, as at 32, by a suitable rivet connection or the like.

In the preferred form the hinge levers 24 and 28 are mounted on opposite sides of the mounting plate 10. This is effective to provide a balanced arrangement in that there is an equal distribution of the weight of the hood cover on opposite sides of the mounting plate. A slot 34 is formed in the mounting plate 10 and is effective to receive the rivet 32 as the hinge moves from one position to another. In this connection, the slot 34 does not perform a so-called guiding function, but merely follows a circumferential path with the pivotal connection 26 as a center.

The lower end of the second hinge lever 28, as shown in FIGURE 2, has a rivet or pin 36 which is effective to operate a camming function along the edge of slot 38. The pin or abutment 36 extends through the mounting plate 10 and is positioned to move in a slot 38. The slot 38 has a pocket 40 offset at one end. When the pin 36 is positioned in the pocket 40, it is effective to hold the bracket 14 and hence the hood cover in the up or open position. In other words, looking at FIGURE 2, when the pin 36 is positioned in the pocket 40 downward movement of the bracket 14, which would result in downward movement of the hood cover, is effective to drive the pin more deeply into the pocket, and thus to prevent closure of the hood cover. Preferably, the slot 38 is disposed in a predetermined angular relationship to the hinge levers and to the slot 34. This particular angular relationship is dictated by the length of the levers and the geometry of the entire hinge arrangement.

A spring 42 which is lighter than most springs conventionally used heretofore in hinge arrangements of this type has one end connected to the mounting plate, as a 44, and has its opposite end connected to the second hinge lever 28, as at 46. The spring connection 46 is adjacent the pin 36. In this connection, it is not necessary to include the spring 42 in the hinge assembly shown in order to hold the hood cover open; however, it is desirable to use the spring as it assists in urging the pin into the pocket and thus indirectly assures maintenance of the hood cover against inadvertent closing. The hinge will be maintained in the open position of FIGURE 2 by means of the pin and pocket arrangement, the spring 42 being effective to maintain the pin in the pocket.

The use, operation and function of the invention are as follows:

Shown and described herein is an articulated hinge assembly of the type conventionally used in raising and lowering the hood cover of an automobile or other vehicle. In particular, the invention relates to a type of hinge suitable for use with a much lighter spring than hinges of this type have normally used and which may in some applications be used without a spring. The spring may be lighter because the hood cover can be held in the raised position by the unique combination of a slot and pocket in the mounting plate and a pin on one of the hinge levers. In previous hinges, the spring had sufficient strength by itself to hold the hood cover open.

Considering first the down or closed position of the hinge as shown in FIGURE 1 to raise the hood cover and hence to open the hinge, pressure is applied in an upward direction such that the second hinge lever 28 is pivotally moved in a clockwise direction. Because lever 28 is pivoted on lever 24, which is pivoted to the mounting plate, the pivotal connection 30 and hence bracket 14 moves up and away or to the right in FIGURE 2, thus clearing the cowl of the vehicle. This upward movement continues until the hood cover has reached the full open position at which point the pin 36 on the second hinge lever drops into the pocket 40 formed at the end of the slot 38. While the second hinge lever is moving in the direction described, the first hinge lever 24 is moving in a counterclockwise direction. The pivotal connection between the two hinge levers is moving in the slot 34. When the hinge is in the full open position, the bracket 14, which supports the hood cover, is in the position of FIGURE 2 and is supported by the two hinge levers and by the link arm 20. In this connection, it is contemplated that there will be two hinges of the type described supporting the hood cover, one on each side of the vehicle.

To lower the hood cover, it is necessary to move the pin 36 out of the pocket 40. Downward movement of the hood cover or movement of the hood cover in a clockwise direction as viewed in FIGURE 2 will not lower the hood as this will merely drive the pin 36 deeper into the pocket 40. In this connection, the spring 42 normally adds additional protection and urges the pin 36 to remain in the pocket 40. To lower the hood cover, it must first move in the direction of arrow 50, at the top of FIGURE 2. This movement will remove the pin 36 from the pocket 40 and place the pin once again in the larger portion of slot 38. Once the pin is out of the pocket, movement of the hood cover in the direction of arrow 52 is effective to close it. Movement of the hood cover in the direction of arrow 52 causes the pin 36 to slide in slot 38 down towards the opposite end of the slot. This will cause the two hinge levers to pivot about pivot point 32 and to move in slot 34 to the position of FIGURE 1.

As can be seen from the above description, the two hinge levers have a scissors-type action. They come closer to the closed position of a scissors when the hood cover is in the open position of FIGURE 2 and they are somewhat similar to the open position of a scissors when they are in the position of FIGURE 1. Both of these levers move in opposite directions about the pivot point 32 when moving from either the open or closed position.

A further feature of the invention is the positioning of the hinge levers on opposite sides of the mounting plate. This provides a more balanced type of arrangement and evenly distributes the weight of the hood cover on the hinge. An additional advantage gained by placing the hinge members on opposite sides of the mounting plate is that hinge lever 28 is interchangeable in that the same lever may be used for either a right-hand or left-hand hinge. This provides economy in the manufacture of the hinge.

Whereas the preferred form of the invention has been shown and described herein, it should be realized that there are many modifications, substitutions and alterations thereto within the scope of the following claims.

I claim:

1. In an articulated hinge assembly, a mounting plate, a first hinge lever pivotally mounted adjacent one of its ends on said plate, a second hinge lever movably mounted on said plate, a link arm pivotally mounted adjacent the opposite end of said first hinge lever, and a bracket pivotally mounted to said link arm and to said second hinge lever, said first and second hinge levers being pivotally connected together intermediate their ends and each moving in opposite directions about said pivot point when said hinge moves from a closed position to an open position, said mounting plate including a slot having an offset pocket, and a pin on said second hinge lever positioned for movement in said slot and effective to hold said hinge in the open position when positioned in said pocket and yielding means secured to said plate and said second hinge lever adjacent said pin, said yielding means being formed and positioned to urge said hinge toward open position and simultaneously to urge said pin toward said pocket, said pivot point being positioned above said pin when said hinge is in open position whereby initial movement of said hinge from open toward closed position is resisted by engagement of said pin in said pocket and an initial movement of said hinge further toward open position is required to move said pin, against the action of said spring, toward said slot and away from engagement with said pocket.

2. An articulated hinge including a mounting plate and a bracket, a plurality of hinge levers pivotally mounted on said plate and pivotally connected to said bracket, said hinge levers moving in opposite directions on said mounting plate when raising said bracket from a lower closed position to an upper open position, abutment means on one of said hinge levers and on said mounting plate effective to hold said hinge in an open position, said abutment means comprising a slot formed in said plate, a laterally offset pocket formed at one end of said slot, a pin carried by one of said hinge levers and movable in said slot, said pin being movable toward and into said pocket when said hinge is moved toward open position, said pocket being offset from said slot in the direction of movement of said pin when said hinge is moved toward closed position, whereby said pin is urged further into said pocket when said hinge is initially moved from said open position directly toward closed position, said pin being movable toward disengagement from said pocket in response to an initial movement of said hinge further toward open position and thereafter movable into and along said slot in response to subsequent movement of said hinge toward closed position, and yielding means secured to said mounting plate and to the hinge lever carrying said pin at a point adjacent said pin, said yielding means being formed and positioned to urge simultaneously and continuously said hinge lever toward open position and said pin toward said pocket.

References Cited in the file of this patent

UNITED STATES PATENTS

| | | |
|---|---|---|
| 1,552,723 | Mielenz | Sept. 8, 1925 |
| 1,838,898 | Aldeen | Dec. 29, 1931 |
| 2,765,207 | Moore | Oct. 2, 1956 |
| 2,873,470 | De Dona | Feb. 17, 1959 |
| 2,946,459 | Rizzuto | July 29, 1960 |
| 2,987,753 | Krause | June 13, 1961 |